US011449758B2

(12) United States Patent
Lin et al.

(10) Patent No.: US 11,449,758 B2
(45) Date of Patent: Sep. 20, 2022

(54) QUANTIZATION AND INFERENCING FOR LOW-BITWIDTH NEURAL NETWORKS

(71) Applicant: QUALCOMM Incorporated, San Diego, CA (US)

(72) Inventors: Jamie Menjay Lin, San Diego, CA (US); Edwin Chongwoo Park, San Diego, CA (US); Nojun Kwak, San Diego, CA (US)

(73) Assignee: Qualcomm Incorproated, San Diego, CA (US)

( * ) Notice: Subject to any disclaimer, the term of this patent is extended or adjusted under 35 U.S.C. 154(b) by 374 days.

(21) Appl. No.: 16/816,117

(22) Filed: Mar. 11, 2020

(65) Prior Publication Data

US 2021/0287095 A1 Sep. 16, 2021

(51) Int. Cl.
*G06N 20/10* (2019.01)
*G06N 3/08* (2006.01)
*G06F 7/523* (2006.01)
*G06N 5/04* (2006.01)

(52) U.S. Cl.
CPC ............. *G06N 3/084* (2013.01); *G06F 7/523* (2013.01); *G06N 5/046* (2013.01); *G06N 20/10* (2019.01)

(58) Field of Classification Search
CPC .... G06N 3/0454; G06N 3/063; G06N 3/0472; G06N 3/08; G06N 3/084; G06N 3/0481; G06N 3/04; G06N 3/088; G06N 3/082; G06N 3/0445; G06N 3/049; G06N 20/00; G06N 3/0635; G06N 3/00; G06N 3/02; G06N 5/046; G06N 20/10; G06F 7/523; G06F 7/5443; G06F 17/16; G06F 7/483; G06F 5/01; G06F 9/30025; G06F 7/544; G06F 9/30018; G06F 2207/4824; G06K 9/66; G06K 9/6271; G06K 9/6267; G06K 9/6273; G06K 9/627; G06K 9/6268; G06K 9/6219; G06K 9/6256; H03M 7/3071; B25J 9/161; G10L 15/16; H04N 19/13

See application file for complete search history.

(56) References Cited

U.S. PATENT DOCUMENTS

| 10,049,323 | B1 | 8/2018 | Kim et al. |
| 10,373,050 | B2* | 8/2019 | Lin ........................ G06V 10/82 |
| 10,831,444 | B2* | 11/2020 | El-Yaniv ................... G06F 7/48 |
| 10,983,754 | B2* | 4/2021 | Vantrease .............. G06N 3/063 |
| 11,276,132 | B2* | 3/2022 | Jung ........................ G06T 1/60 |
| 11,294,628 | B2* | 4/2022 | Jang ...................... G06F 7/4925 |
| 2021/0150306 | A1 | 5/2021 | Lin et al. |

OTHER PUBLICATIONS

An Introduction to Convolutional Neural Networks. Keiron O'Shea et al. (Year: 2015).*

(Continued)

*Primary Examiner* — Vibol Tan
(74) *Attorney, Agent, or Firm* — Seyfarth Shaw LLP

(57) ABSTRACT

A method for operating a low-bitwidth neural network includes converting a first activation to a non-negative value (e.g., absolute value). The first activation has a signed value. The sign of the activation is used to select a weight value. A product of the non-negative activation and the selected weight value is computed to determine a next activation. The next activation is quantized and supplied to a subsequent layer of the low-bitwidth neural network.

20 Claims, 8 Drawing Sheets

(56) References Cited

OTHER PUBLICATIONS

Design Flow of Accelerating Hybrid Extremely Low Bit-width Neural Network in Embedded FPGA. Junsong Wang et al. (Year: 2018).*
Optimizing FPGA-based Accelerator Design for Deep Convolutional Neural Networks. Chen Zhang et al. (Year: 2015).*
Recent advances in convolutional neural networks. Jiuxiang Gu et al. (Year: 2017).*
Variable Rate Image Compression With Recurrent Neural Networks. George Toderici et al. (Year: 2016).*
Zhou H., et al., "Deep Networks with Non-Static Activation Function", Multimedia Tools and Applications, Kluwer Academic Publishers, Boston, US, vol. 78, No. 1, Jan. 31, 2018, pp. 197-211, [retrieved on Jan. 31, 2018].
Shang W., et al., "Understanding and Improving Convolutional Neural Networks via Concatenated Rectified Linear Units", arxiv. org, Cornell University Library, 201 Olin Library Cornell University Ithaca, NY 14853, Mar. 16, 2016, 17 Pages.

\* cited by examiner

• SDW $(m,n) = (2, 2)$ $$\underbrace{\begin{matrix}3\\2\\1\\0\end{matrix}}_{502} * \underbrace{\begin{matrix}1\\-1\end{matrix}}_{504} = \underbrace{\begin{matrix}3\\2\\1\\0\\-1\\-2\\-3\end{matrix}}_{506} \underbrace{\text{to be represented with}}_{} \underbrace{\begin{matrix}3\\2\\1\\0\\-1\\-2\\-3\\-4\end{matrix}}_{508} \rightarrow \underbrace{\sum_{i,j} p_{i,j}}_{510} \rightarrow \underbrace{\begin{matrix}3\\2\\1\\0\end{matrix}}_{512}, sgn(a_{i,j})$$

*FIG. 5*

QUANTIZATION AND INFERENCING FOR LOW-BITWIDTH NEURAL NETWORKS

BACKGROUND

Field

Aspects of the present disclosure generally relate to deep convolutional neural networks and more particularly, to a quantization process and associated operations for improved efficiency and accuracy of neural networks.

Background

Artificial neural networks may comprise interconnected groups of artificial neurons (e.g., neuron models). The artificial neural network may be a computational device or represented as a method to be performed by a computational device. Convolutional neural networks, such as deep convolutional neural networks, are a type of feed-forward artificial neural network. Convolutional neural networks may include layers of neurons configured in a tiled receptive field.

Deep convolutional neural networks (DCNs) are used in various technologies, such as image recognition, speech recognition, autonomous driving, and Internet of Things (IoT) devices. Embedded IoT devices may have constrained resources, such as limited on-chip memory. As such, the use of DCNs on these devices may be constrained. It is desirable to improve the use of DCNs on devices with limited resources.

SUMMARY

In one aspect of the present disclosure, a method for operating a low-bitwidth neural network is presented. The method includes converting a first activation to a non-negative value (e.g., absolute value), the first activation having a sign value. The method also include selecting a weight value. The method further includes computing a product of the non-negative value and the selected weight value to determine a next activation. Additionally, the method includes quantizing the next activation, the next activation being supplied to a subsequent layer of the low-bitwidth neural network.

In another aspect of the present disclosure, an apparatus for operating a low-bitwidth neural network is presented. The apparatus includes a memory and one or more processors. The processor(s) are configured to convert a first activation to a non-negative value (e.g., absolute value), the first activation having a sign value. The processor(s) are also configured to select a weight value. The processor(s) are additionally configured to compute a product of the non-negative value and the selected weight value to determine a next activation. Furthermore, the processor(s) are configured to quantize the next activation, the next activation being supplied to a subsequent layer of the low-bitwidth neural network.

In yet another aspect of the present disclosure, an apparatus for operating a low-bitwidth neural network is presented. The apparatus includes means for converting a first activation to a non-negative value, the first activation having a sign value (e.g., absolute value). The apparatus also include means for selecting a weight value. The apparatus further includes means for computing a product of the non-negative value and the selected weight value to determine a next activation. Additionally, the apparatus includes means for quantizing the next activation, the next activation being supplied to a subsequent layer of the low-bitwidth neural network.

Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

FIG. 5 is diagram illustrating exemplary sign-directed quantization and weighting in accordance with aspects of the present disclosure.

DETAILED DESCRIPTION

Figure 1:
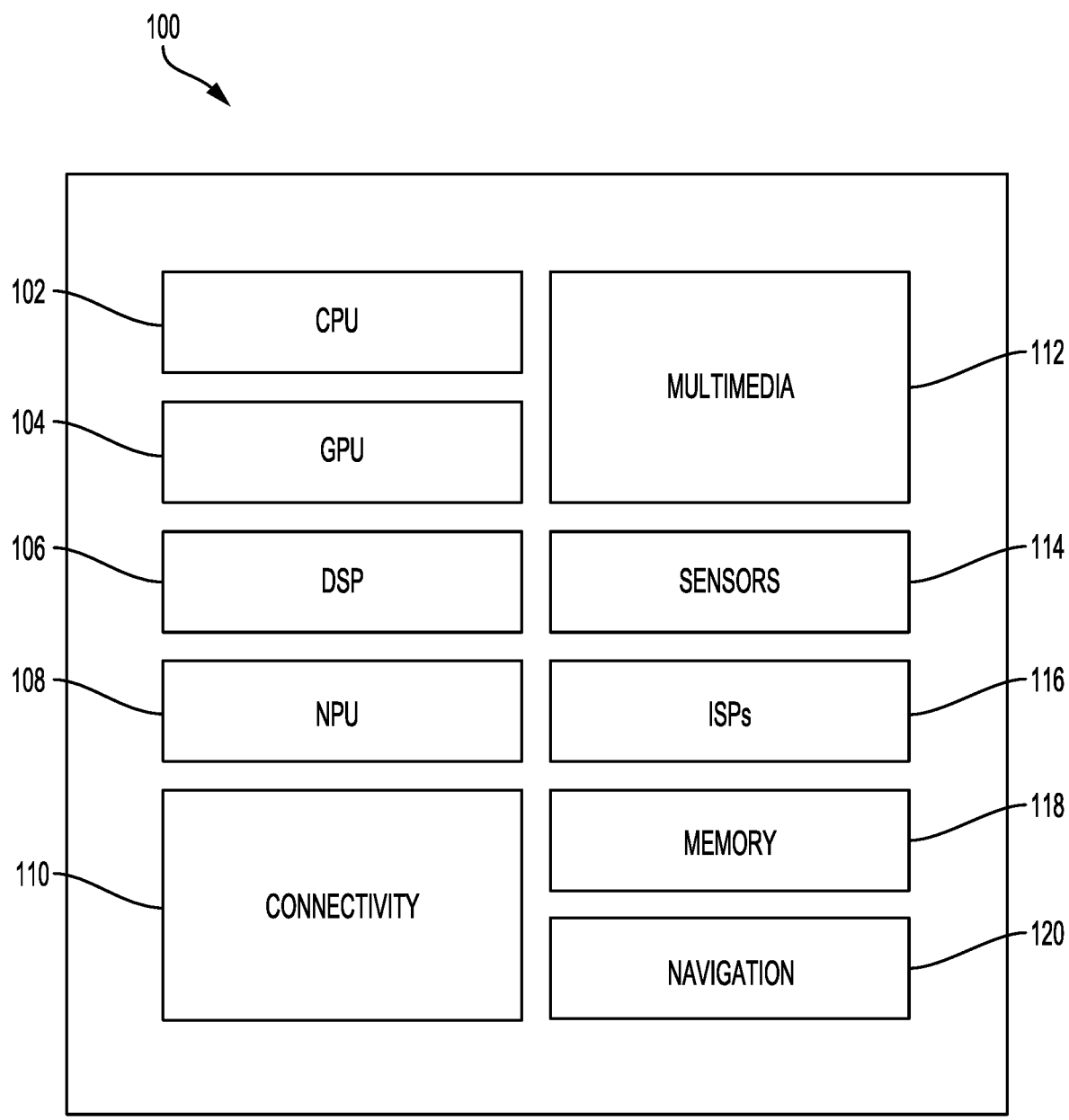
FIG. 1 illustrates an example implementation of designing a neural network using a system-on-a-chip (SOC), including a general-purpose processor in accordance with certain aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method practiced using other structure, functionality, or structure and functionality in addition to or other than the various aspects of the disclosure set forth. It should be understood that any aspect of the disclosure disclosed may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Neural networks are organized into layers of interconnected nodes. Generally, a node (or neuron) is where computation happens. For example, a node may combine input data with a set of weights (or coefficients) that either amplifies or dampens the input data. The amplification or dampening of the input signals may thus be considered an assignment of relative significances to various inputs with regard to a task the network is trying to learn. Generally, input-weight products are summed (or accumulated) and then the sum is passed through a node's activation function to determine whether and to what extent that signal should progress further through the network.

In a most basic implementation, a neural network may have an input layer, a hidden layer, and an output layer. "Deep" neural networks generally have more than one hidden layer.

Deep learning is a method of training deep neural networks. Generally, deep learning maps inputs to the network and outputs from the network and is thus sometimes referred to as a "universal approximator" because it can learn to approximate an unknown function $f(x)=y$ between any input x and any output y. In other words, deep learning finds the right function $f$ to transform x into y.

More particularly, deep learning trains each layer of nodes based on a distinct set of features, which is the output from the previous layer. Thus, with each successive layer of a deep neural network, features become more complex. Deep learning is powerful because it can progressively extract higher level features from input data and perform complex tasks, such as object recognition, by learning to represent inputs at successively higher levels of abstraction in each layer, thereby building up a useful feature representation of the input data.

For example, if presented with visual data, a first layer of a deep neural network may learn to recognize relatively simple features, such as edges, in the input data. In another example, if presented with auditory data, the first layer of a deep neural network may learn to recognize spectral power in specific frequencies in the input data. The second layer of the deep neural network may then learn to recognize combinations of features, such as simple shapes for visual data or combinations of sounds for auditory data, based on the output of the first layer. Higher layers may then learn to recognize complex shapes in visual data or words in auditory data. Still higher layers may learn to recognize common visual objects or spoken phrases. Thus, deep learning architectures may perform especially well when applied to problems that have a natural hierarchical structure.

In an aspect of the present disclosure, a neural network may perform quantization and arithmetic operations (e.g., convolution) for a particular activation $a_{l,i}$ and its corresponding weight $w_{l,i,j}$ at layer l and input channel i and output channel j.

Through training with a given dataset, $a_{l,c}$, $a_{l,i}$ may have a value range $R=\max(a_{l,i})-\min(a_{l,i})$, $R>0$, and represent $a_{l,i}$, which may be represented with B (B>0) bits.

The dataset $a_{l,c}$ may approximately conform to a Gaussian distribution with mean μ and standard deviation σ, namely, $a_{l,i} \sim N(\mu,\sigma^2)$, over layers of operations (e.g., convolutions, batch normalization) in the neural network. When μ is close to 0 and as the distribution has better symmetry, the representation efficiency of $a_{l,i}$ may be higher.

In some aspects, batch normalization may be used preceding a layer of interest to make the network learn an optimal scale and bias of the batch normalization transform BN based on the associated activation distribution.

Quantization may be performed for activation $a_{l,i}$ and its corresponding weight $w_{l,i,j}$ at layer l and (input) channel i. The activation (signed) $a_{l,i}$ may include m bits and the weight (signed) $w_{l,i,j}$ may include n bits. In some aspects, the bitwidths for the activations and weights may be the same (e.g., 2). However, this is merely exemplary for ease of explanation and different bitwidths may also be used. Upon availability for multiplications (e.g., convolution), $a_{l,i}$ and $w_{l,i,j}$ may be used to compute an associated product. Thereafter, a quantization process (e.g., rounding or truncation) may be performed to derive an activation $a_{l+1,j}$ for layer l+1 and channel j.

When m and n become small (e.g., 2) for few-bitwidth (1 or 2-bit) neural networks, conventional quantization and arithmetic operations may become inefficient or result in accuracy losses.

Accordingly, aspects of the present disclosure are directed to quantization and inferencing for few-bitwidth neural networks. In an aspect of the present disclosure, a sign-directed quantization and weighting is disclosed in which quantization and weighting are activation sign-directed. That is, handling of activations and weights may be based on a sign of an activation. Activations may be converted into non-negative operands (e.g., absolute value of the activation) for multiplication. Sign bits may be removed or separated from the activation value. The sign bits may be used to select a sign of a weight value operand. As such, weights as signed operands may reflect the sign of associated activations. In some aspects, the neural network may further be trained in a phase selective approach to improve accuracy.

In some aspects, where a phase selective training technique is not applied, (n−2+1)=1 instead of (n)=2 bits may be used for layer l. In other words, the weight memory consumption may be reduced (e.g., $M_l/2$), while enjoying equal or better model accuracy performance. The product $p_{l,i,j}$ may maintain the same precision and symmetry with respect to the activations. On the other hand, where a phase selective training technique is applied, (n−2+1)*2=2 bits may be used for layer 1 and the product $p_{l,i,j}$ may maintain the same precision. However, model accuracy may be significantly improved.

In some aspects, the activation value range can be partitioned further for $a_{l,i}$ into more than two regions. For example, four regions may be used to enable further reduction in the number of bits for weights.

FIG. 1 illustrates an example implementation of a system-on-a-chip (SOC) 100, which may include a central processing unit (CPU) 102 or a multi-core CPU configured for sign-directed quantization and weighting in a low-bitwidth neural network, in accordance with certain aspects of the present disclosure. Variables (e.g., neural signals and synaptic weights), system parameters associated with a computational device (e.g., neural network with weights), delays, frequency bin information, and task information may be stored in a memory block associated with a neural processing unit (NPU) 108, in a memory block associated with a CPU 102, in a memory block associated with a graphics processing unit (GPU) 104, in a memory block associated with a digital signal processor (DSP) 106, in a memory block 118, or may be distributed across multiple blocks. Instructions executed at the CPU 102 may be loaded from a program memory associated with the CPU 102 or may be loaded from a memory block 118.

The SOC 100 may also include additional processing blocks tailored to specific functions, such as a GPU 104, a DSP 106, a connectivity block 110, which may include fifth generation (5G) connectivity, fourth generation long term evolution (4G LTE) connectivity, Wi-Fi connectivity, USB connectivity, Bluetooth connectivity, and the like, and a multimedia processor 112 that may, for example, detect and recognize gestures. In one implementation, the NPU is implemented in the CPU, DSP, and/or GPU. The SOC 100 may also include a sensor processor 114, image signal processors (ISPs) 116, and/or navigation module 120, which may include a global positioning system.

The SOC 100 may be based on an ARM instruction set. In an aspect of the present disclosure, the instructions loaded into the general-purpose processor 102 may comprise code for converting a first activation to a non-negative value (e.g., absolute value). The first activation has a signed value. The general-purpose processor 102 may also comprise code to select a weight value based on a sign of the activation. The general-purpose processor 102 may further comprise code to compute a product of the non-negative activation and the selected weight value to determine a next activation. The general-purpose processor 102 may still further comprise code to quantize the next activation. The next activation may be supplied to a subsequent layer of the low-bitwidth neural network.

Deep learning architectures may perform an object recognition task by learning to represent inputs at successively higher levels of abstraction in each layer, thereby building up a useful feature representation of the input data. In this way, deep learning addresses a major bottleneck of traditional machine learning. Prior to the advent of deep learning, a machine learning approach to an object recognition problem may have relied heavily on human engineered features, perhaps in combination with a shallow classifier. A shallow classifier may be a two-class linear classifier, for example, in which a weighted sum of the feature vector components may be compared with a threshold to predict to which class the input belongs. Human engineered features may be templates or kernels tailored to a specific problem domain by engineers with domain expertise. Deep learning architectures, in contrast, may learn to represent features that are similar to what a human engineer might design, but through training. Furthermore, a deep network may learn to represent and recognize new types of features that a human might not have considered.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 2A:
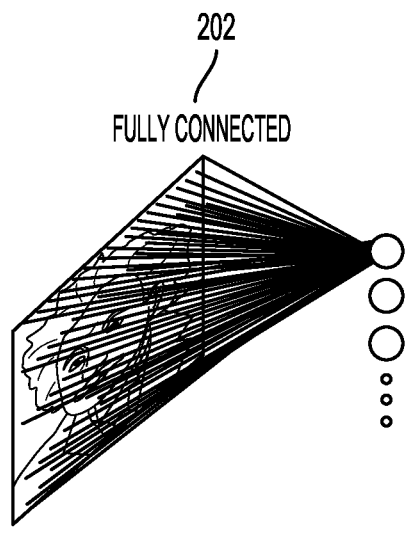
FIGS. 2A, 2B, and 2C are diagrams illustrating a neural network in accordance with aspects of the present disclosure.
Figure 2B:
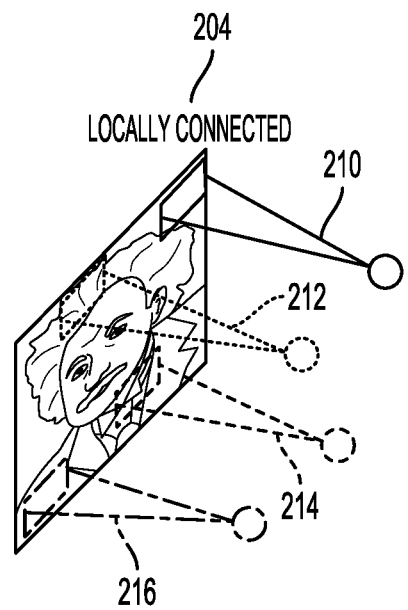

The connections between layers of a neural network may be fully connected or locally connected. FIG. 2A illustrates an example of a fully connected neural network 202. In a fully connected neural network 202, a neuron in a first layer may communicate its output to every neuron in a second layer, so that each neuron in the second layer will receive input from every neuron in the first layer. FIG. 2B illustrates an example of a locally connected neural network 204. In a locally connected neural network 204, a neuron in a first layer may be connected to a limited number of neurons in the second layer. More generally, a locally connected layer of the locally connected neural network 204 may be configured so that each neuron in a layer will have the same or a similar connectivity pattern, but with connections strengths that may have different values (e.g., 210, 212, 214, and 216). The locally connected connectivity pattern may give rise to spatially distinct receptive fields in a higher layer, because the higher layer neurons in a given region may receive inputs that are tuned through training to the properties of a restricted portion of the total input to the network.

Figure 2C:
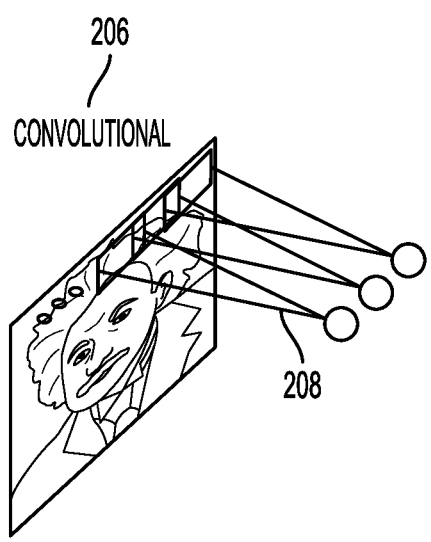

One example of a locally connected neural network is a convolutional neural network. FIG. 2C illustrates an example of a convolutional neural network 206. The convolutional neural network 206 may be configured such that the connection strengths associated with the inputs for each neuron in the second layer are shared (e.g., 208). Convolutional neural networks may be well suited to problems in which the spatial location of inputs is meaningful.

Figure 2D:
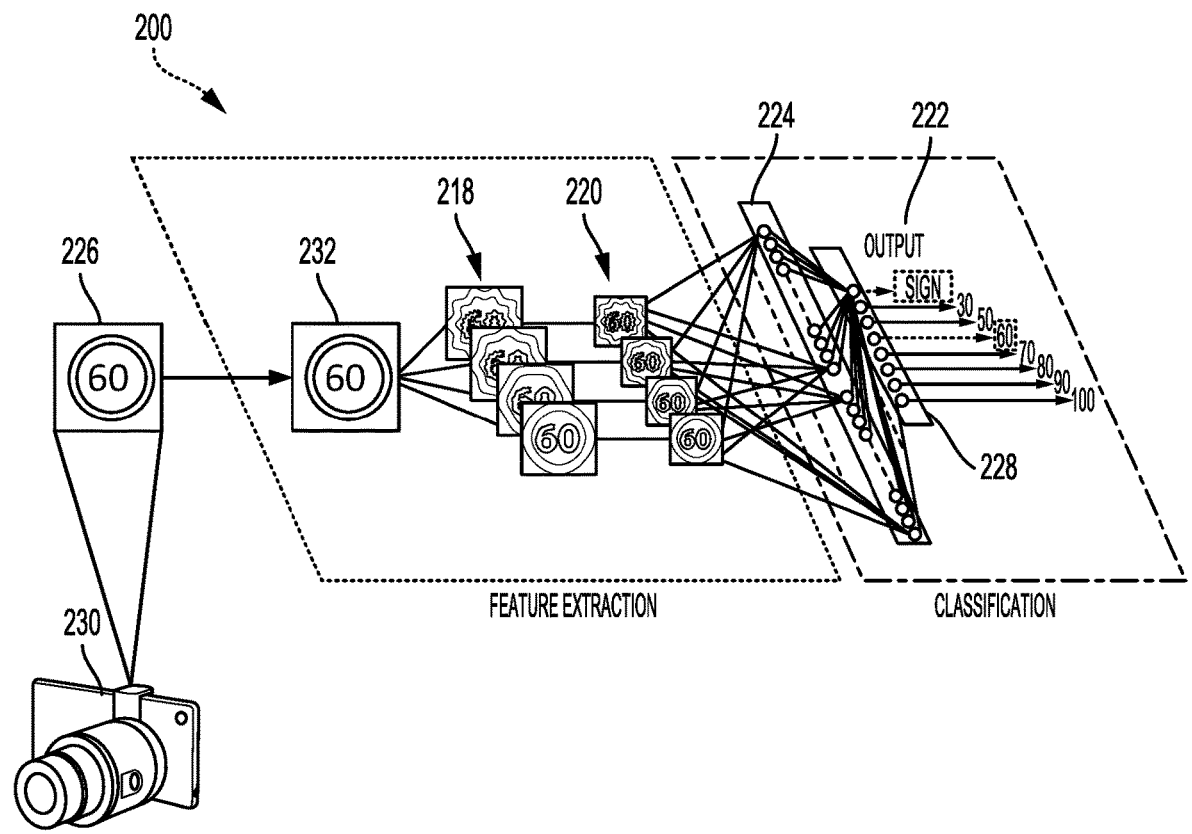
FIG. 2D is a diagram illustrating an exemplary deep convolutional network (DCN) in accordance with aspects of the present disclosure.

One type of convolutional neural network is a deep convolutional network (DCN). FIG. 2D illustrates a detailed example of a DCN 200 designed to recognize visual features from an image 226 input from an image capturing device 230, such as a car-mounted camera. The DCN 200 of the current example may be trained to identify traffic signs and a number provided on the traffic sign. Of course, the DCN 200 may be trained for other tasks, such as identifying lane markings or identifying traffic lights.

The DCN 200 may be trained with supervised learning. During training, the DCN 200 may be presented with an image, such as the image 226 of a speed limit sign, and a forward pass may then be computed to produce an output 222. The DCN 200 may include a feature extraction section and a classification section. Upon receiving the image 226, a convolutional layer 232 may apply convolutional kernels (not shown) to the image 226 to generate a first set of feature maps 218. As an example, the convolutional kernel for the convolutional layer 232 may be a 5×5 kernel that generates 28×28 feature maps. In the present example, because four different feature maps are generated in the first set of feature maps 218, four different convolutional kernels were applied to the image 226 at the convolutional layer 232. The convolutional kernels may also be referred to as filters or convolutional filters.

The first set of feature maps 218 may be subsampled by a max pooling layer (not shown) to generate a second set of feature maps 220. The max pooling layer reduces the size of the first set of feature maps 218. That is, a size of the second set of feature maps 220, such as 14×14, is less than the size of the first set of feature maps 218, such as 28×28. The reduced size provides similar information to a subsequent layer while reducing memory consumption. The second set of feature maps 220 may be further convolved via one or more subsequent convolutional layers (not shown) to generate one or more subsequent sets of feature maps (not shown).

In the example of FIG. 2D, the second set of feature maps 220 is convolved to generate a first feature vector 224. Furthermore, the first feature vector 224 is further convolved to generate a second feature vector 228. Each feature of the second feature vector 228 may include a number that corresponds to a possible feature of the image 226, such as "sign," "60," and "100." A softmax function (not shown) may convert the numbers in the second feature vector 228 to a probability. As such, an output 222 of the DCN 200 is a probability of the image 226 including one or more features.

In the present example, the probabilities in the output 222 for "sign" and "60" are higher than the probabilities of the others of the output 222, such as "30," "40," "50," "70," "80," "90," and "100". Before training, the output 222 produced by the DCN 200 is likely to be incorrect. Thus, an error may be calculated between the output 222 and a target output. The target output is the ground truth of the image 226 (e.g., "sign" and "60"). The weights of the DCN 200 may then be adjusted so the output 222 of the DCN 200 is more closely aligned with the target output.

To adjust the weights, a learning algorithm may compute a gradient vector for the weights. The gradient may indicate an amount that an error would increase or decrease if the weight were adjusted. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level. After learning, the DCN may be presented with new images (e.g., the speed limit sign of the image 226) and a forward pass through the network may yield an output 222 that may be considered an inference or a prediction of the DCN.

Deep belief networks (DBNs) are probabilistic models comprising multiple layers of hidden nodes. DBNs may be used to extract a hierarchical representation of training data sets. A DBN may be obtained by stacking up layers of Restricted Boltzmann Machines (RBMs). An RBM is a type of artificial neural network that can learn a probability distribution over a set of inputs. Because RBMs can learn a probability distribution in the absence of information about the class to which each input should be categorized, RBMs are often used in unsupervised learning. Using a hybrid unsupervised and supervised paradigm, the bottom RBMs of a DBN may be trained in an unsupervised manner and may serve as feature extractors, and the top RBM may be trained in a supervised manner (on a joint distribution of inputs from the previous layer and target classes) and may serve as a classifier.

Deep convolutional networks (DCNs) are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer, with each element of the feature map (e.g., 220) receiving input from a range of neurons in the previous layer (e.g., feature maps 218) and from each of the multiple channels. The values in the feature map may be further processed with a non-linearity, such as a rectification, max(0, x). Values from adjacent neurons may be further pooled, which corresponds to down sampling, and may provide additional local invariance and dimensionality reduction. Normalization, which corresponds to whitening, may also be applied through lateral inhibition between neurons in the feature map.

The performance of deep learning architectures may increase as more labeled data points become available or as computational power increases. Modern deep neural networks are routinely trained with computing resources that are thousands of times greater than what was available to a typical researcher just fifteen years ago. New architectures and training paradigms may further boost the performance of deep learning. Rectified linear units may reduce a training issue known as vanishing gradients. New training techniques may reduce over-fitting and thus enable larger models to achieve better generalization. Encapsulation techniques may abstract data in a given receptive field and further boost overall performance.

Figure 3:
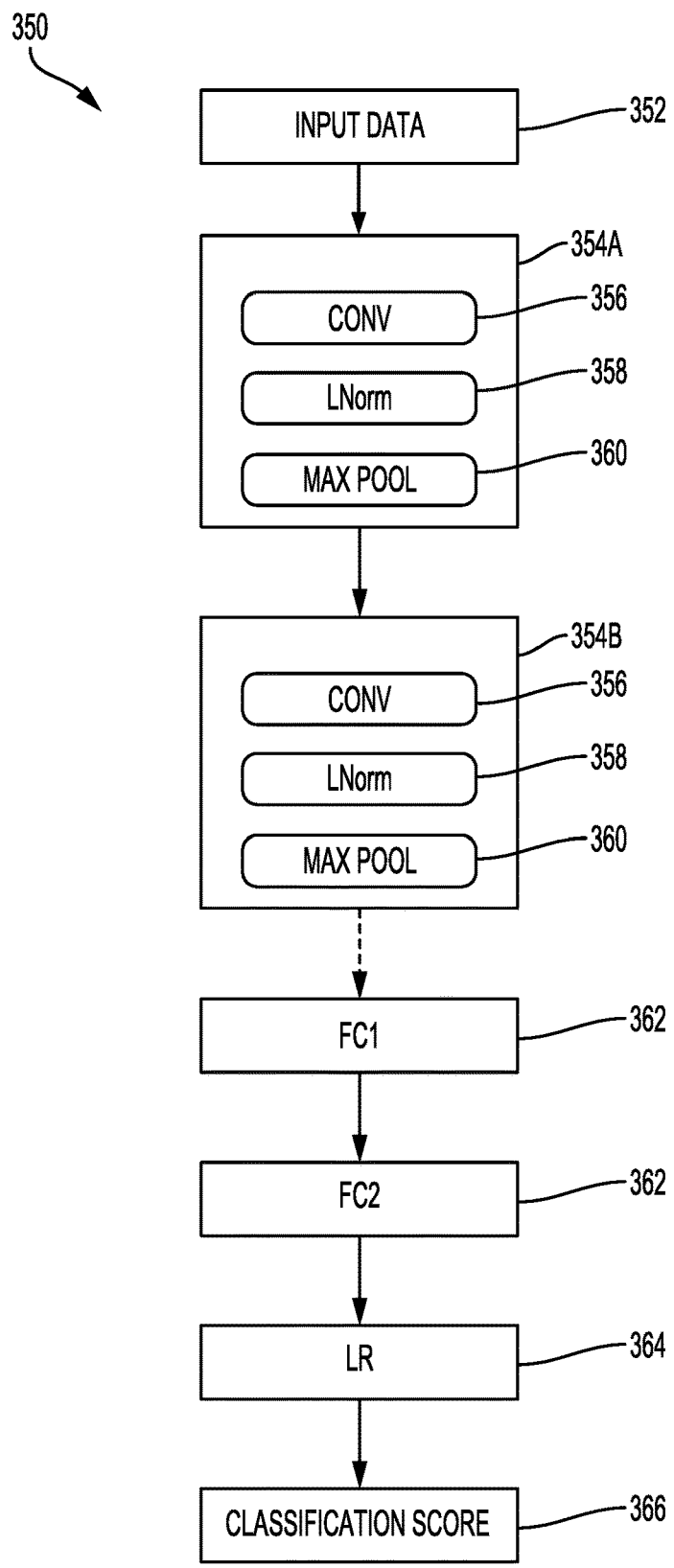
FIG. 3 is a block diagram illustrating an exemplary deep convolutional network (DCN) in accordance with aspects of the present disclosure.

FIG. 3 is a block diagram illustrating a deep convolutional network 350. The deep convolutional network 350 may include multiple different types of layers based on connectivity and weight sharing. As shown in FIG. 3, the deep convolutional network 350 includes the convolution blocks 354A, 354B. Each of the convolution blocks 354A, 354B may be configured with a convolution layer (CONV) 356, a normalization layer (LNorm) 358, and a max pooling layer (MAX POOL) 360.

The convolution layers 356 may include one or more convolutional filters, which may be applied to the input data to generate a feature map. Although only two of the convolution blocks 354A, 354B are shown, the present disclosure is not so limiting, and instead, any number of the convolution blocks 354A, 354B may be included in the deep convolutional network 350 according to design preference. The normalization layer 358 may normalize the output of the convolution filters. For example, the normalization layer 358 may provide whitening or lateral inhibition. The max pooling layer 360 may provide down sampling aggregation over space for local invariance and dimensionality reduction.

The parallel filter banks, for example, of a deep convolutional network may be loaded on the CPU 102 or GPU 104 of the SOC 100 to achieve high performance and low power consumption. In alternative embodiments, the parallel filter banks may be loaded on the DSP 106 or the ISP 116 of the SOC 100. In addition, the deep convolutional network 350 may access other processing blocks that may be present on the SOC 100, such as the sensor processor 114 and the navigation module 120, dedicated, respectively, to sensors and navigation.

The deep convolutional network 350 may also include one or more fully connected layers 362 (FC1 and FC2). The deep convolutional network 350 may further include a logistic regression (LR) layer 364. Between each layer 356, 358, 360, 362, 364 of the deep convolutional network 350 are weights (not shown) that are to be updated. The output of each of the layers (e.g., 356, 358, 360, 362, 364) may serve as an input of a succeeding one of the layers (e.g., 356, 358, 360, 362, 364) in the deep convolutional network 350 to learn hierarchical feature representations from input data 352 (e.g., images, audio, video, sensor data and/or other input data) supplied at the first of the convolution blocks 354A. The output of the deep convolutional network 350 is a classification score 366 for the input data 352. The classification score 366 may be a set of probabilities, where each probability is the probability of the input data, including a feature from a set of features.

Neural networks may process vast amounts of data in order to perform a desired task such as classification of an image or speech recognition, for example. Quantization techniques may be used to represent the data or other values in a more compact form to speed processing within the neural network at the expense of some accuracy. In few-bitwidth or low-bitwidth neural networks (e.g., where activations or weight values have bitwidth of 2 bits), conventional quantization and arithmetic operations may become problematic and suffer from significant efficiency or accuracy losses.

Accordingly, aspects of the present disclosure are directed to quantization and inferencing for few-bitwidth neural networks. In an aspect of the present disclosure, a sign-directed quantization and weighting is disclosed in which quantization and weighting are activation sign-directed. That is, handling of activations and weights may be based on a sign of an activation. Activations may be converted into non-negative operands (e.g., absolute value of the activation) for multiplication. Sign bits may be removed or separated from the activation value. The sign bits may be used to select a sign of a weight value operand. As such, weights as signed operands may reflect the sign of associated activations. Using the disclosed quantization and inferencing may reduce the weight memory used while maintaining the number of multiplications and accuracy performance. In some aspects, the neural network may further be trained in a phase selective approach to improve accuracy.

Figure 4:
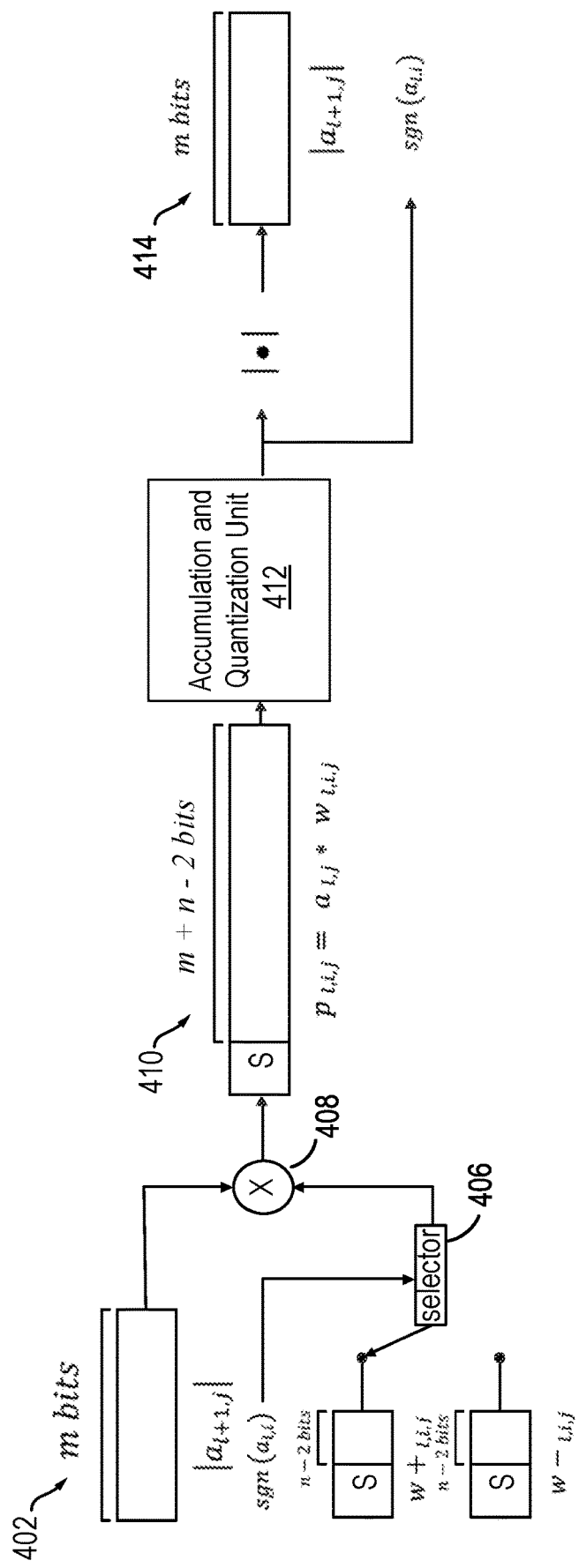
FIG. 4 is a block diagram illustrating quantization and inferencing for low-bitwidth networks in accordance with aspects of the present disclosure.

FIG. 4 is a block diagram illustrating quantization and inferencing for low-bitwidth networks in accordance with aspects of the present disclosure. Referring to FIG. 4, activation $a_{l,i}$ may be received (402). A sign (sgn) of the activation $a_{l,i}$ may be extracted or removed and the activation $a_{l,i}$ may be converted to a non-negative operand (e.g., absolute value of the activation) having m bits. For example, a non-negative operand may be determined by taking the two's complement ($2^N-1$) of the activation. A signed weight (e.g., $w_{l,i,j}^+$ or $w_{l,i,j}^-$) may be selected via a selector 406. In one example, selector 406 may select a signed weight based on the extracted sign (sgn) of the activation $a_{l,i}$.

In some aspects, for few-bitwidth network design when n=2, the bits other than the sign for the weights may be n−1=1. As such, the remaining 1 bit may be used to indicate a +1 or −1.

Additionally, in some aspects, the $w_{l,i,j}^+$ and $w_{l,i,j}^-$ may be weights trained specifically for positive and negative activations, respectively, using advanced techniques of phase selective convolutions, which enables significantly higher accuracy. Furthermore, $w_{l,i,j}^+$ and $w_{l,i,j}^-$ may be optimums when the signs of the activations are also taken into account for more specific weight derivation during training. However, if such advanced training techniques are not applied during training, then $w_{l,i,j}^+=w_{l,i,j}^-$ for a given l, i, and j and the neural network may be operated such that only one set of weights is stored, thereby reducing the memory consumption.

The non-negative activation and the selected signed weight may be multiplied (convolved) by a multiplication unit 408 to produce a signed product $p_{l,i,j}=a_{l,i}*w_{l,i,j}$ with a bitwidth of m+n−2. The product $p_{l,i,j}$ may be accumulated and quantized (e.g., truncated or rounded) via an accumulation and quantization unit 412. The accumulation and quantization unit 412 may output a quantized next activation. The sign of the quantized next activation may be extracted and the next activation may be converted to a non-negative value having m bits. In turn, the non-negative next activation $a_{l+1,j}$ (414) may be supplied to a subsequent layer of the neural network for processing.

Notably, the disclosed sign-directed quantization and weighting is particularly well-suited to the neural network design principle of depth-first computation. With depth-first processing, the activations produced as the output from a layer may be directly consumed as the input to the next layer without activation memory storage/access. Depth-first processing allows simultaneous processing of multiple layers based on a size of the on-chip memory (e.g., operational memory or local memory). The number of layers for processing may be determined based on whether the on-chip memory can support the next layer's receptive fields and kernel. If so, then that next layer is added to a layer set for depth-first processing. If not, then a partition may be generated and the next layer may be assigned to a different layer set for depth-first processing. The values of a last layer of each layer set are written to the off-chip memory. The last layer may be referred to as the cut-off layer. In this case, the non-negative next activations (e.g., absolute values of the next activations) and the corresponding extracted signs (sgn $a_{l,i}$) can be efficiently passed on to the next layer for processing.

In one example, the number of bits for activation and weight (for a subsequent layer) may be respectively given by (m,n)=(2, 2). An unsigned activation $a_{l,i}$ of 2 bits may represent a value range [0, 3]. A special "signed" weight $w_{l,i,j}$ of 1 bit may be used to represent 2 values {−1, +1}. The unsigned activation $a_{l,i}$ and the signed weight $w_{l,i,j}$ may be multiplied (convolved), for instance, via the multiplication unit 408 to produce a product $p_{l,i,j}=a_{l,i}*w_{l,i,j}$ of 3 bits. The product may be accumulated over other products as $\Sigma_{i,j}(p_{l,i,j})$ and rounded/truncated to m=2 bits via the accumulation and quantization unit 412. The accumulated and quantized product (e.g., next activation) may be converted to a non-negative or absolute value. The non-negative or unsigned activations may be supplied to a subsequent layer for processing. Additionally, the 1-bit signs of the next activation may be separately fed to the next layer for weight (+/−) selection (e.g., via the selector 406).

FIG. 5 is diagram illustrating exemplary sign-directed quantization and weighting in accordance with aspects of the present disclosure. Referring to FIG. 5, the number of bits for activation and weight (for a subsequent layer) may be respectively given by (m, n)=(2, 2). An unsigned activation ($a_{l,i}$) 502 of 2 bits having a value range [0, 3] is convolved with a weight 504 in which 1 bit represents the value {−1, +1}. The convolution produces a signed product 506 with a symmetric range [−3, 3]. Because only one bit of the two bits available is used for the weight value, the signed product may "steal" or utilize the bit for added precision. Thus, the signed product 506 may be represented (e.g., using two's complement with 3 bits) by a next activation 508, which has a broader range of [−4, 3]. The next activation 508 may be accumulated and quantized 510 (e.g., truncated or rounded). Thereafter, the sign of the next activation may be extracted (sgn($a_{l,i}$)) and the next activation may be converted to a non-negative next activation 512, which may be supplied to a subsequent layer along with an extracted sign (sgn($a_{l,i}$)) of the neural network and used to perform a desired task (e.g., image classification, character or speech recognition).

In some aspects, a bitwise exclusive OR operation (XOR) may perform an operation that is equivalent to a multiplication operation. By using the disclosed bitwise XOR, the computation complexity of neural networks may be reduced. In one example, the number of bits for activation and weight (for a subsequent layer) may be respectively given by (m,n)=(2, 2). The bitwise multiplication $\circledast_b$ may be expressed as $$\circledast_b(W,A) \triangleq \{Ext(W, WidthOf(A)) \oplus A\} + W, \quad (1)$$

where, W and A are the weight and activation as operations for multiplication, $\circledast_b$ corresponds to the function of bitwise multiplication, Ext(x,k) is a bit-extension function for the 1-bit operand x, WidthOf(x) is a function for deriving a number of bits for x, $\oplus$ is the bitwise "exclusive or" function and + is the conventional arithmetic plus function.

Figure 6:
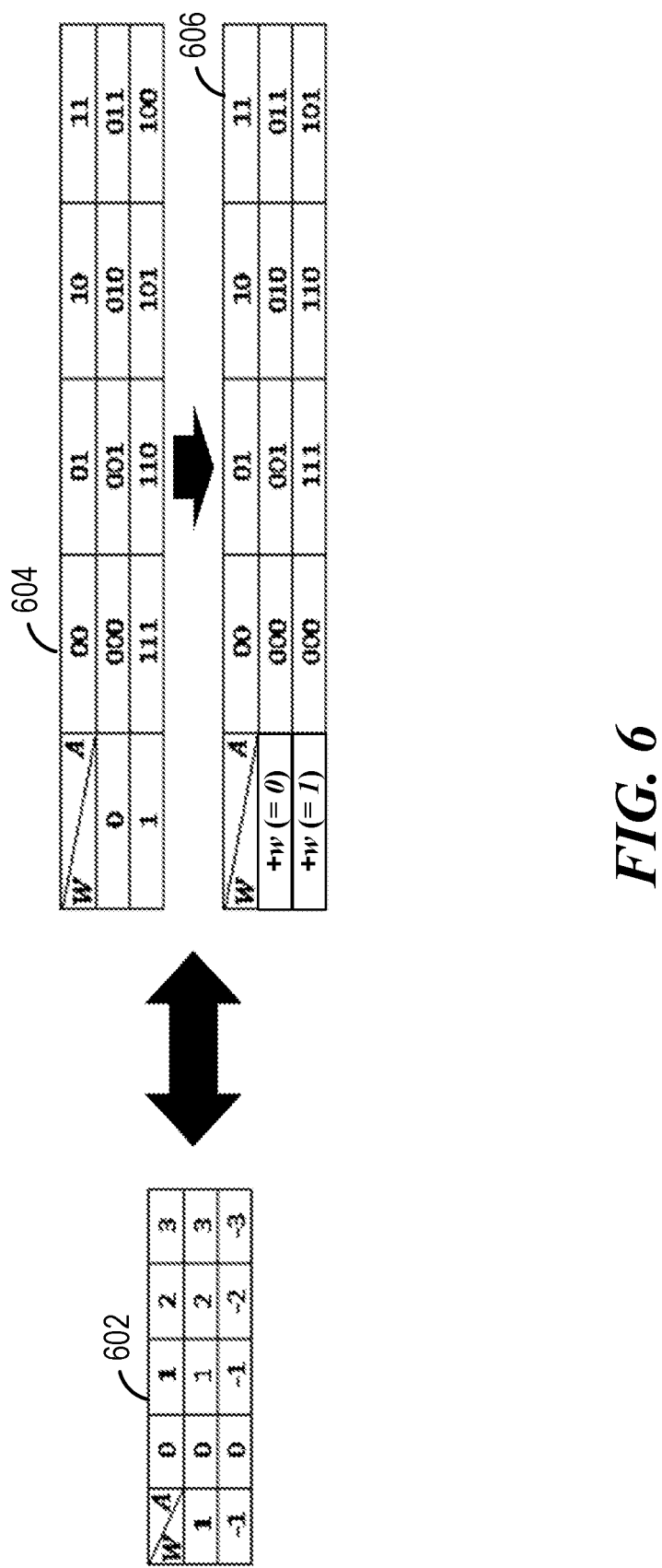
FIG. 6 is a diagram illustrating an example of bitwise multiplication in accordance with aspects of the present disclosure.

FIG. 6 is a diagram illustrating an example of bitwise multiplication in accordance with aspects of the present disclosure. Referring to FIG. 6, a truth table 602 shows products of activations (A) and weights (W) determined using a multiplication operation such as is performed, for instance, in FIG. 5 (e.g., see elements 502, 504, and 506). On the other hand, truth tables 604 and 606 illustrate determining the products of activations (A) and weights (W) using the equivalent bitwise XOR as expressed in Equation 1. In the truth table 604, the value of activations (A) and weights (W) are represented in binary numbers. The weight value of +1 as shown in the truth table 602 is represented with a 0 in the truth table 604 and the weight value of −1 shown in the truth table 602 is represented with a 1 in the truth table 604. Rather than perform a multiplication operation, an XOR operation is performed. As indicated in Equation 1, the weight value (e.g., as shown in the truth table 604, add either 0 or 1) may be added to the result of the XOR operation (shown in the truth table 604) to produce each of the elements of the truth table 606. In other words, the weight value of 0 or 1 is added to the results of the XOR operation shown in the truth table 604. For example, as shown in the truth table 604, where the activation value is 01 and the weight is 1, the result of the XOR operation is the binary value 110. Adding the weight value, where the value is 1 (representing a negative weight value), results in a value of 111 as shown in the truth table 606. The sums reflected in the row corresponding to the negative weight are the two's compliment representations of [0, −1, 2, −3]. Accordingly, the bitwise multiplication producing the products of the truth table 602 may be replaced with the XOR and addition operations, which are computationally less expensive. In some aspects, the bit multiplication may also be performed using a table lookup.

Figure 7:
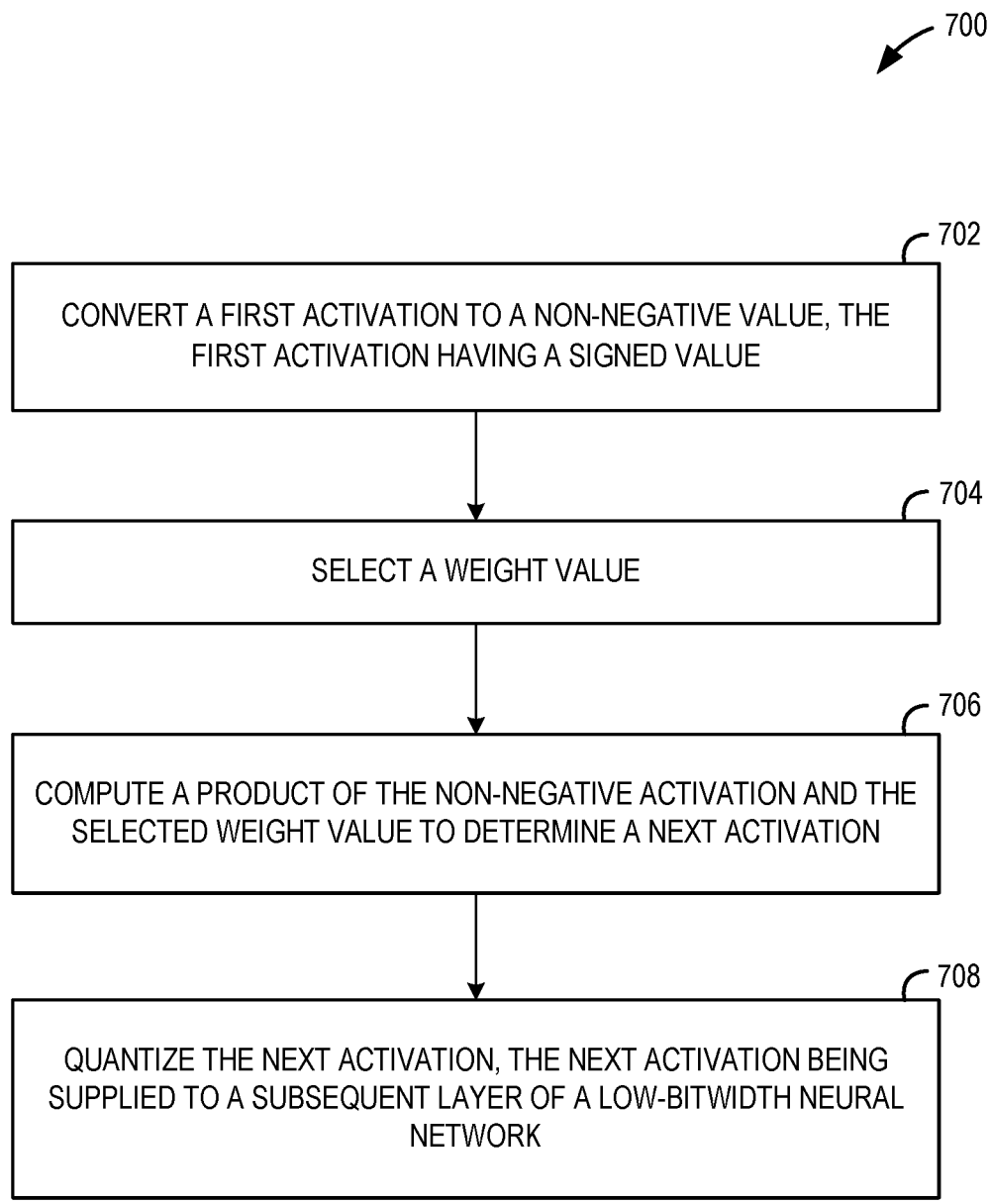
FIG. 7 is a flow diagram illustrating a method for operating a low-bitwidth neural network according to aspects of the present disclosure.

FIG. 7 is a flow diagram illustrating a method 700 for operating a low-bitwidth neural network. At block 702, a processor (e.g., the CPU 102) converts a first activation to a non-negative value. The first activation has a signed value. In some aspects, the processor may convert the first activation to a non-negative value by computing the absolute value of the first activation. Referring to FIG. 4, a sign (sgn) of the activation $a_{l,i}$ may be extracted or removed and the activation $a_{l,i}$ may be converted to a non-negative operand having m bits. For example, a non-negative operand may be determined by taking the two's complement ($2^N-1$) of the activation.

At block 704, the processor selects a weight value based on a sign of the activation. As shown in FIG. 4, the selector 406 may be used to select a positive weight value or a negative weight value based on the sign bits sgn $a_{i,l}$ of the first activation (402). In some aspects, the positive weight value $w_{l,i,j}^+$ and the negative weight value $w_{l,i,j}^-$ may be weights trained specifically for positive and negative activations, respectively, using advanced techniques of phase selective convolutions, which enables significantly higher accuracy performance. Furthermore, $w_{l,i,j}^+$ and $w_{l,i,j}^-$ may be optimums when the signs of activations are also taken into account for more specific weight derivation during training.

At block 706, the processor computes a product of the non-negative activation and the selected weight value to determine a next activation. As shown with respect to FIG. 4, the non-negative activation and the selected signed weight may be multiplied (convolved) via multiplication unit 408 (e.g., the CPU 102, NPU 108 or ISP 116) to produce a signed product $p_{l,i,j}=a_{l,i}*w_{l,i,j}$ with a bitwidth of m+n−2.

In some aspects, the product may be computed using a bitwise exclusive OR (XOR) operation. For instance, as shown in FIG. 6, rather than performing a multiplication operation, an exclusive OR operation is performed. As indicated in Equation 1, the weight value may be added to the result of the XOR operation to produce the truth table 606. In other words, the weight value of 0 or 1 is added to the results of the XOR operation shown in the truth table 604. For example, as shown in the truth table 604, where the activation value is 01 and the weight is 1, the result of the XOR operation is the binary value 110.

At block 708, the processor quantizes the next activation. The next activation is supplied to a subsequent layer of a low-bitwidth neural network. Referring to FIG. 4, the product $p_{l,i,j}$ may be accumulated and quantized (e.g., truncated or rounded) via the accumulation and quantization unit 412. The accumulation and quantization unit may output a quantized next activation. The sign of the quantized next activation may be extracted and the next activation may be converted to a non-negative value having m bits. In turn, the non-negative next activation $a_{l+1,j}$ (414) may be supplied to a subsequent layer of the neural network for processing.

The various operations of methods described above may be performed by any suitable means capable of performing the corresponding functions. The means may include various hardware and/or software components) and/or module(s), including, but not limited to, a circuit, an application specific integrated circuit (ASIC), or processor. Generally, where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general-purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, erasable programmable read-only memory (EPROM), electrically erasable programmable read-only memory (EEPROM), registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read only memory (ROM), programmable read-only memory (PROM), erasable programmable read-only memory (EPROM), electrically erasable programmable Read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or general register files. Although the various components discussed may be described as having a specific location, such as a local component, they may also be configured in various ways, such as certain components being configured as part of a distributed computing system.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method for operating a low-bitwidth neural network, comprising:
   converting a first activation to a non-negative value of the first activation, the first activation having a sign value;
   selecting a weight value;
   computing a product of the non-negative value of the first activation and the selected weight value to determine a next activation; and quantizing the next activation, the next activation being supplied to a subsequent layer of the low-bitwidth neural network.

2. The method of claim 1, further comprising:
extracting sign bits of the first activation, the sign bits corresponding to a sign of the first activation; and
wherein the weight value is selected based at least in part on the sign of the first activation.

3. The method of claim 1, in which the first activation is a two bit value and the weight value is a one bit value.

4. The method of claim 1, further comprising computing the product by a bitwise exclusive OR (XOR) function based on the non-negative value of the first activation and the selected weight value.

5. The method of claim 1, further comprising training the weight value for positive or negative activations using a phase selective convolution technique.

6. The method of claim 1, in which the next activation is represented as a non-negative value of the next activation, sign bits of the next activation being extracted and supplied to a next layer with the non-negative value of the next activation.

7. The method of claim 1, in which the non-negative value of the first activation comprises an absolute value of the first activation.

8. An apparatus for operating a low-bitwidth neural network, comprising:
a memory; and
at least one processor coupled to the memory, the at least one processor being configured:
to convert a first activation to a non-negative value of the first activation, the first activation having a sign value;
to select a weight value;
to compute a product of the non-negative value of the first activation and the selected weight value to determine a next activation; and
to quantize the next activation, the next activation being supplied to a subsequent layer of the low-bitwidth neural network.

9. The apparatus of claim 8, in which the at least one processor is further configured:
to extract sign bits of the first activation, the sign bits corresponding to a sign of the first activation; and
to select the weight value based at least in part on the sign of the first activation.

10. The apparatus of claim 8, in which the first activation is a two bit value and the weight value is a one bit value.

11. The apparatus of claim 8, in which the at least one processor is further configured to compute the product by a bitwise exclusive OR (XOR) function based on the non-negative value of the first activation and the selected weight value.

12. The apparatus of claim 8, in which the at least one processor is further configured to train the weight value for positive or negative activations using a phase selective convolution technique.

13. The apparatus of claim 8, in which the at least one processor is further configured:
to represent the next activation as the non-negative value of the next activation; and
to extract sign bits of the next activation and to supply the extracted sign bits to a next layer with the non-negative value of the next activation.

14. The apparatus of claim 8, in which the non-negative value of the first activation comprises an absolute value of the first activation.

15. An apparatus for operating a low-bitwidth neural network, comprising:
means for converting a first activation to a non-negative value of the first activation, the first activation having a sign value;
means for selecting a weight value;
means for computing a product of the non-negative value of the first activation and the selected weight value to determine a next activation; and
means for quantizing the next activation, the next activation being supplied to a subsequent layer of the low-bitwidth neural network.

16. The apparatus of claim 15, further comprising:
means for extracting sign bits of the first activation, the sign bits corresponding to a sign of the first activation; and
means for selecting the weight value based at least in part on the sign of the first activation.

17. The apparatus of claim 15, in which the first activation is a two bit value and the weight value is a one bit value.

18. The apparatus of claim 15, further comprising means for computing the product by a bitwise exclusive OR (XOR) function based on the non-negative value of the first activation and the selected weight value.

19. The apparatus of claim 15, further comprising means for training the weight value for positive or negative activations using a phase selective convolution technique.

20. The apparatus of claim 15, further comprising means for representing the next activation as the non-negative value of the next activation, and
means for extracting sign bits of the next activation and
means for supplying the extracted sign bits to a next layer with the non-negative value of the next activation.

* * * * *